United States Patent Office 3,445,199
Patented May 20, 1969

3,445,199
PREPARATION OF ZIRCONIUM COMPOUNDS
Bernard Henri Paul Fehr and Joseph Gascon, Thann, Haut-Rhin, France, assignors to Fabriques de Produits Chimiques de Thann et de Mulhouse, Thann, France, a corporation of France
Continuation-in-part of application Ser. No. 381,149, July 3, 1964. This application May 25, 1967, Ser. No. 649,062
Claims priority, application France, July 9, 1963, 940,775; June 2, 1966, 63,910
Int. Cl. C01g 25/06
U.S. Cl. 23—315                                    19 Claims

ABSTRACT OF THE DISCLOSURE

A basic zirconium sulfate convertible to industrial zirconium compounds is prepared by reacting sodium silico-zirconate frit in aqueous suspension with hydrochloric acid, reacting the resulting solution of the zirconium content, which contains colloidal silica in dilute state with sulfate ions in the presence of fluorine ions, moderately heating the reaction solution, and settling out and washing the precipitate. The reactions can be effected advantageously by attacking the frit suspension with a mixture of hydrochloric, sulfuric and hydrofluoric acids.

---

Figure 1:
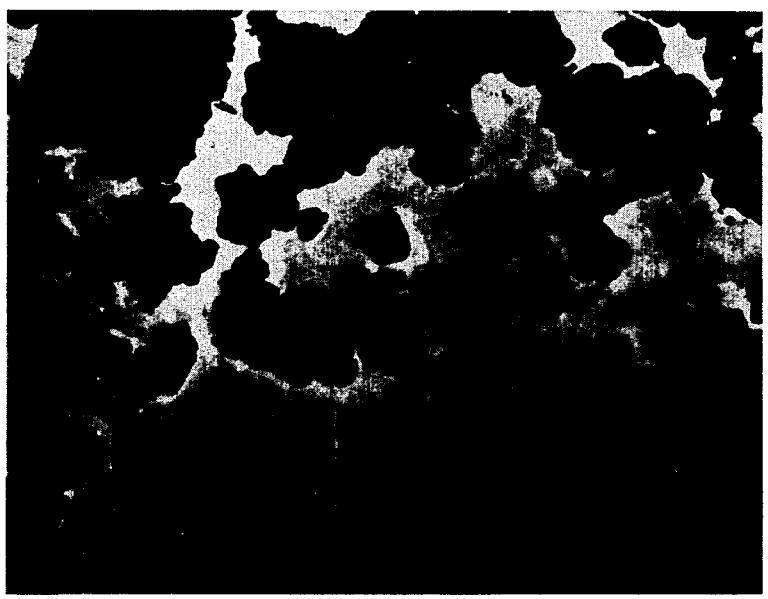

This is a continuation-in-part of our copending application, Ser. No. 381,149, filed July 3, 1964, now abandoned.

This invention relates to a process for the preparation of zirconium compounds and to the products obtained. More particularly, it concerns the preparation of zirconium compounds from alkali metal silico-zirconates such as sodium silico-zirconate.

Compounds of zirconium are generally prepared from zircon sand, which contains the natural silicate of zirconium, $ZrSiO_4$. This mineral is usually fritted with sodium carbonate, the zirconium silicate being thus converted into sodium silico-zirconate which is readily decomposed by acids.

In a well known method the frit is decomposed by the action of concentrated mineral acids, which bring about practically complete insolubilization of the silica content and the production of a solution from which the zirconium can be precipitated by the addition of suitable reactants. That method is quite expensive, as it requires extensive equipment and large amounts of acid must be used to obtain a satisfactory insolubilization of the silica.

It has been recognized that the frit can be brought into colloidal solution by reaction with smaller amounts of inorganic acids in the dilute state, followed by treatment of the formed colloidal solution to precipitate the zirconia out of the liquid suspension of collidal silica. The dissolving is effected, for example, by dilute sulfuric acid; by the addition of a potassium salt to the solution a double sulfate of zirconium and potassium is precipitated.

Still another proposal has been to precipitate an oxysulfate of zirconium from a solution of impure zirconia containing sulfuric acid, hydrochloric acid and alkali metal salts, the silica staying in suspension if the reaction conditions are suitably controlled.

The two processes last mentioned, however, have little practical usefulness. The colloidal solution formed has such poor stability that the separation of the desired precipitate from the silica is difficult, and at times is impossible due to gelation of the reaction medium.

It is therefore a principal object of the present invention to provide a process which eliminates the abovementioned shortcomings of the known methods of preparing zirconium compounds from sodium silico-zirconate.

More particular objects of the invention are to enable the preparation of a remarkably stable colloidal solution from the known frit of sodium silico-zirconate and then the precipitation of a zirconium compound that can be readily separated, washed and recovered in substantially silica-free form with good yields, while leaving practically all of the silica in colloidal solution.

Another object is to provide a process of preparing zirconium compounds which is extraordinarily simple, economical and fast to carry out and yet will still yield zirconium compounds of good purity.

A further object is to provide a precipitated finely divided basic sulfate of zirconium which itself is a valuable new substance that can be used economically for the preparation of industrial zirconium compounds such as zirconia, $ZrO_2$, or zirconium salts.

It has been discovered that these objects can be attained by a process in which a frit of alkali metal silico-zirconate, such as sodium silico-zirconate frit having the approximate composition $Na_2O \cdot SiO_2 \cdot ZrO_2$, is suspended in an aqueous medium and dissolved therein by reaction with hydrochloric acid, with the formation of a solution containing colloidal silica and a basic oxychloride of zirconium, and the zirconium content of this solution in dilute state is precipitated by reacting it with sulfate ions in the presence of fluorine ions and moderately heating the solution. In this way, the zirconium content is transformed into a finely divided basic zirconium sulfate that is insoluble in and readily separable from the reaction liquid containing the colloidal silica.

The presence of fluorine ions has been found to enable a nearly quantitative precipitation and recovery of the zirconium content in a form substantially free of silica.

The frit to be treated can be prepared from zircon sand by conventional practice so as to have the approximate composition $Na_2O \cdot SiO_2 \cdot ZrO_2$. It is desirable that its composition be not greatly different from this formula and, accordingly, that the zircon be practically completely decomposed in the fritting process. The corresponding potassium silico-zirconate may also be prepared in a known manner and used according to the invention, although the expense involved in preparing it ordinarily makes the use of the potassium compound unattractive. The frit conveniently is ground in the dry state and then suspended in water to form a dilute aqueous suspension for treatment.

According to an original practice of our invention, the dilute aqueous suspension of the frit is reacted in unheated or cold state with approximately 3 mols of hydrochloric acid per mol of $ZrO_2$ present, in order to dissolve the sodium silico-zirconate, and after the dissolution the zirconium content is precipitated in the formed colloidal solution by the addition of sulfate ions and fluorine ions and moderate heating of the resulting solution.

In general, the invention according to that practice is carried out as follows:

The starting suspension is prepared to contain between 100 and 250 grams of the frit per liter, for example, about 160 to 200 g./l.

The suspension is kept at a temperature not exceeding 25° C., preferably being cooled to about 5–15° C. by additions of ice or the use of refrigerating coils, and while kept in the cold state and thoroughly agitated it is brought to a pH in the range of 0.4 to 0.7, for example, to pH 0.5, by incremental additions of a dilute solution of hydrochloric acid. This acid is ordinarily added to a total amount about 5 to 10% in excess of 3 mols of HCl per mol of the ZrO content of the suspension.

The resulting colloidal solution, preferably after being decanted from residual insolubles and further diluted to a concentration of about 25–30 grams or less of $ZrO_2$ content per liter, is treated with sulfuric acid and/or sodium sulfate in an amount supplying between 0.4 and 0.8 mol, e.g., approximately 0.5 mol, of sulfate ions per mol of the $ZrO_2$ content, and with hydrofluoric acid and/or a water soluble fluoride in an amount equivalent to about 6 to 8% of HF based upon the weight of the $ZrO_2$ content. The sulfate additions bring the pH to about 0.75 to 1.20. The solution then is heated gradually to and at a temperature between about 35° and 50° C. to accelerate and complete the precipitation. The temperature in no event is to exceed 55° C., for this would be likely to cause at least partial gelation of the silica present.

Finally, the precipitate formed is allowed to settle out, and it can be recovered readily by decantation of the silica-containing mother liquid, washing and centrifuging.

The precipitate thus obtained is a finely divided basic zirconium sulfate showing upon analysis the approximate chemical composition $2ZrO_2.SO_3.xH_2O$. It is readily recovered in an amount corresponding to more than 90% of the zirconium content of the dissolved frit. Microscopic and X-ray analyses show it to be of amorphous structure.

Upon being calcined, the precipitated basic zirconium sulfate prepared by the above practice becomes an industrially pure zirconia containing, typically, about 99% of $ZrO_2+HfO_2$. The principal impurities are $SiO_2$ and $Na_2O$ in amounts of about 0.05 to 0.3% and 0.1 to 0.4%, respectively, depending upon the efficiency of the washing. The product can be used for the preparation of various salts of zirconium by treating it according to known methods of double decomposition.

It will be evident that while said original practice of the invention will give a nearly quantitative yield of a precipitated zirconium sulfate having a relatively high purity, the cooling or refrigeration of the suspension for the dissolution of the frit and other reaction procedures employed may be undesirably time consuming and costly.

According to a further aspect of the invention, we have discovered that the use of a cooled dilute suspension for the dissolution of the frit can be dispensed with and a simpler and faster reaction procedure brought about, while still obtaining a high yield of a substantially silica-free precipitated basic zirconium sulfate of good purity, by carrying out the process with the precipitating reactants present during the dissolution, or at least in a latter stage thereof.

In this modified practice, a dilute aqueous suspension of sodium silico-zirconate which may be at normal or room temperature but should have a low frit concentration of about 75–80 grams or less per liter, is attacked by a mixture of hydrochloric acid and sulfuric acid in the presence of fluorine ions. A solution of mixed hydrochloric, sulfuric and hydrofluoric acids may be added gradually to the suspension, or the hydrochloric acid may be added and the precipitating acids added afterward while the frit is being dissolved. The sodium silico-zirconate thus is transformed directly into a colloidal composition from which the insoluble basic zirconium sulfate will precipitate.

Instead of requiring approximately 3 mols of HCl per mol of $ZrO_2$, the process can be carried out in this way by the use of not more than 2 mols of hydrochloric acid per mol of the $ZrO_2$ content, but with the addition of a determined quantity of sulfuric acid which may vary in the range of about 0.4 to 0.8 mol of sulfate ions per mol of the $ZrO_2$ content and in the presence of fluorine ions, preferably introduced as a hydrofluoric acid solution, in approximately the amount mentioned hereinbefore.

It has been found that under such conditions the presence of the fluorine ions will enable the precipitation and recovery of 80% or more of the zirconium content in the form of the basic zirconium sulfate.

In order to avoid coagulation of the silica, it is desirable to maintain the suspension at a concentration not exceeding 25 grams of $ZrO_2$ content per liter when the hydrochloric, sulfuric and hydrofluoric acids have been added in the entire amounts required.

The precipitation can be accelerated by moderate heating of the reaction suspension to about 50° C. A substantially higher temperature, such as one above 55° C., increases the risk of coagulation or gelation of the silica.

The reactions according to this modified practice appear to proceed most favorably when the total acid additions amount to approximately 1.9 mols of HCl and approximately 0.7 mol of sulfuric acid per mol of the $ZrO_2$ content and about 7 to 8% of HF based upon the weight of the $ZrO_2$ content, and when the suspension is reacted at a concentration of about 20 grams of $ZrO_2$ content per liter.

The precipitate formed in this practice can be readily settled out and recovered from the colloidal reaction solution, calcined to form an industrial $ZrO_2$, and converted into various zirconium salts, such as the carbonates and nitrates, in substantially the same manner as the product of said original embodiment. Calcination transforms it into zirconium oxide having a purity of about 95–96%.

Since the product precipitated according to our invention does not appear to be a previously defined compound, we have designated it herein by a general name, calling it a basic sulfate of zirconium without thus making any supposition as to its constitution.

Figure 2:
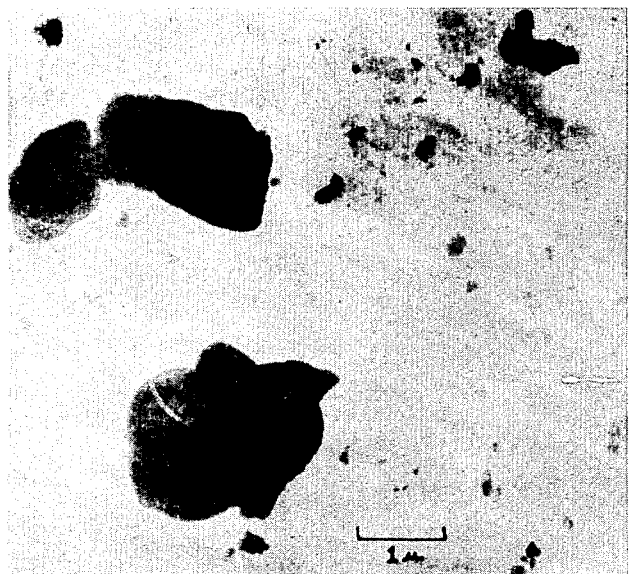

In the accompanying drawing, FIG. 1 is a microphotograph of a speciment of the basic sulfate of zirconium, and FIG. 2 is an electron micrograph of a dried specimen thereof having a zirconium content, calculated as $ZrO_2$, of about 58% by weight.

The invention will be further understood from the following illustrative examples of practices thereof.

EXAMPLE 1

400 kgs. of ground sodium silico-zirconate frit of the approximate composition $Na_2O.SiO_2.ZrO_2$ are placed in suspension in 400 liters of water. While keeping the suspension under good agitation, 480 liters of 35% hydrochloric acid and 800 kgs. of ice are added to it, little by little, so as to maintain the temperature in the vicinity of 10° C., preferably between 5° and 10° C.

This operation takes place over a period of about 6 hours and brings the resultant solution to a $ZrO_2$ content of about 100 grams per liter.

After ceasing the agitation, the solution is decanted to eliminate insoluble matter. Then 2 cubic meters of the solution are diluted by the addition of 6 cubic meters of water at ambient temperature, to provide a $ZrO_2$ concentration of 25 to 30 grams per liter for the sulfatation. Then 250 kg. of $Na_2SO_4.10H_2O$ and 18 liters of 70% hydrofluoric acid are added, bringing the solution to a pH of 1.1.

The solution is now heated slowly by the injection of steam (not superheated) for a period of 2 hours until its temperature is raised to 45° C. In this period a nearly quantitative precipitation of the zirconium content is obtained in the form of a finely divided basic sulfate of the character herein described. The precipitate is separated by decantation of the mother liquor, washed by two decantations with the use of 6 cubic meters of unheated water in each, and dried in a centrifuge.

EXAMPLE 2

500 kgs. of ground frit ($Na_2O.SiO_2.ZrO_2$) are added to 100 liters of water in a reaction vessel of 2.5 cubic meters capacity, which is refrigerated by brine. A suspension is thus obtained with a regulated initial temperature of between 6° and 8° C.

While keeping this suspension under good agitation, 580 liters of hydrochloric acid of 35% concentration are added to it in fractions of 50 liters each, which are added separately at time intervals of about 10 minutes so as to keep the temperature stabilized at between 8° and 12° C. After 100 liters of the acid have been added, 100 liters of water are poured into the suspension.

The reaction is allowed to continue for about 6 hours after the last of the acid additions, the solution meanwhile having been decanted into a container of 5 cubic meters capacity and brought to a volume of 2,500 liters by a final addition of water.

After decantation for the removal of insolubles, the colloidal solution formed is poured into a container of 100 cubic meters capacity, and to it are added about 5 cubic meters of water, 20 liters of hydrofluoric acid (72–75% concentration), 15.5 liters of concentrated sulfuric acid and 215 kgs. of $Na_2SO_4.10H_2O$. Water is then added until the volume of the solution reaches 8.5 cubic meters, the concentration in $ZrO_2$ thus being regulated to about 27–28 grams per liter and the pH being brought to a value in the vicinity of 0.80.

The solution then is heated slowly, while being kept under agitation, by the injection of steam in such manner as to bring it to a temperature of 40° C. at the end of 2 hours.

The basic sulfate thus formed is separated from the mother liquor by decantation, washed and decanted twice by the use of 7.5 cubic meters of water in each instance, and dried in a centrifuge.

The dried basic sulfate of zirconium had the form of a white, friable powder of the formula $$2ZrO_2.SO_3.xH_2O$$

It showed an ignition loss of about 60% averaging between 60 and 65%. Upon being calcined at 950° to 1000° C., it yielded a zirconia of the following composition:

| | Percent |
|---|---|
| $ZrO_2+HfO_2$ | 99 |
| Residue, $SiO_2$ | 0.2 |
| $Fe_2O_3$ | 0.03 |
| $TiO_2$ | 0.1 |
| $Na_2O$ | 0.3 |

EXAMPLE 3

400 kg. of crushed frit ($SiO_2.ZrO_2.Na_2O$) are placed in suspension in 4,400 liters of water. 276 liters of 34% hydrochloric acid are added with good agitation. At the end of 1 hour after the addition, the suspension is diluted with about 3,000 liters of water and then 60 liters of concentrated sulfuric acid and 17.4 liters of 70% hydrofluoric acid are poured in. The volume is made up to 8.8 cubic meters with water. The suspension is slowly heated by injection of steam, with agitation, so as to obtain a temperature of 50° C. at the end of 2½ hours. The basic sulfate formed is allowed to settle out and is then washed by two decantations, each of 7.5 cubic meters of hot water, and centrifuged.

The centrifuged product is collected in the form of a friable white powder having approximately the formula $2ZrO_2.SO_3.xH_2O$ and an ignition loss of about 67%. By calcining it at 950–1000° C. in a continuous furnace, a zirconia of the following composition is obtained:

| | Percent |
|---|---|
| $ZrO_2+HfO_2$ | 96.0 |
| Zircon | 2.80 |
| $SiO_2$ | 0.25 |
| $Fe_2O_3$ | 0.045 |
| $TiO_2$ | 0.15 |
| $Al_2O_3$ | 0.12 |
| $NaO_2$ | 0.30 |

EXAMPLE 4

A solution of mixed acids is prepared in a rubberized vat to contain:

| | | |
|---|---|---|
| 98% $H_2SO_4$ | liters | 91.5 |
| 34% HCl | do | 285 |
| 70% HF | do | 24 |
| Water | cubic meters | 1.7 |

The volume of this solution is about 2 cubic meters.

Separately, 500 kg. of $SiO_2.ZrO_2.Na_2O$ frit is poured into a tank of 11 cubic meters capacity originally containing 6 cubic meters of water. The tank is provided with an agitator which brings the contents into a homogeneous suspension.

The prepared solution of mixed acids is added at an even rate to the frit suspension over a period of 2 hours. The decomposition of the frit takes place slowly without any sudden increase in temperature up to 30° C. The precipitation of the basic zirconium sulfate is effectuated by slowly heating the suspension to 45° C. over the course of 1½ hours and continuing agitation for a further ½ hour after the end of the heating. The reactions take a total of four hours.

The basic sulfate formed is allowed to settle out, the mother liquor containing the colloidal silica is removed, and the sulfate is washed and separated in a centrifuge bowl of 1 meter in diameter rotating at 800 r.p.m. The sulfate is calcined at 950° C. in a continuous furnace of the annular hearth type, giving a zirconium oxide of the following average composition:

| | Percent |
|---|---|
| $ZrO_2+HfO_2$ | 95–96 |
| Unattacked zircon | 2–3 |
| Free silica | 0.3–1 |
| $Na_2O$ | 0.3–0.4 |
| $TiO_2$ | 0.2 |
| $Fe_2O_3$ | 0.07–0.09 |

While we have described various details and examples of practices of our invention, it is to be understood that the invention can be practiced in other ways and that it is not restricted to particulars of the foregoing description except as may be required by a fair construction of the appended claims.

What is claimed is:

1. A process for the preparation of a basic sulfate of zirconium substantially free of silica, which comprises dissolving a finely divided alkali metal silico-zirconate by reacting it in dilute aqueous suspension with hydrochloric acid, thus forming a solution of its zirconium content which contains colloidal silica, reacting the zirconium content of said solution in dilute state, in the presence of fluorine ions, with sulfate ions in an amount sufficient to convert said content into an insoluble basic zirconium sulfate, precipitating said basic sulfate in the reaction solution by subjecting said solution to an elevated temperature not substantially exceeding 55° C., and settling out and separating the precipitate.

2. A process according to claim 1, said silico-zirconate being a finely divided frit having the approximate composition $Na_2O.SiO_2.ZrO_2$.

3. A process for the preparation of a basic sulfate of zirconium substantially free of silica, which comprises dissolving a finely divided frit of sodium silico-zirconate by reacting it in a dilute aqueous suspension thereof maintained at a temperature not exceeding 25° C. with approximately 3 mols of hydrochloric acid per mol of $ZrO_2$ contained in the frit, thus forming a solution of its zirconium content which contains colloidal silica, after dissolution adding to said solution in dilute state fluorine ions and sulfate ions in amount sufficient to convert the dissolved zirconium content into an insoluble basic zirconium sulfate, precipitating said sulfate in said solution in the presence of such ions by subjecting said solution to an elevated temperature not substantially exceeding 55° C., and settling and separating the precipitate from the colloidal medium.

4. A process according to claim 3, said suspension being kept cooled to a temperature of about 5–15° C. during the dissolution.

5. A process according to claim 3, said suspension being refrigerated and simultaneously diluted by the addition of ice thereto in the course of the dissolution.

6. A process according to claim 3, said suspension containing said frit at a concentration of between 100 and 250 grams of the frit per liter.

7. A process according to claim 3, said hydrochloric acid being incorporated into said suspension by gradually adding to said suspension a dilute solution of HCl until the pH of the suspension is in the range of 0.4 to 0.7.

8. A process according to claim 3, said dilute colloidal solution being at a concentration not exceeding about 25–30 grams of $ZrO_2$ content per liter.

9. A process according to claim 3, said sulfate ions being added by adding to said dilute colloidal solution sulfuric acid or sodium sulfate or both in an amount equivalent to from 0.4 to 0.8 mol of such ions per mol of zirconium content calculated as $ZrO_2$.

10. A process according to claim 3, said fluorine ions being added by adding to said dilute colloidal solution hydrofluoric acid or a water soluble fluoride or both in an amount equivalent to about 6 to 8% of HF based on the weight of the zirconium content calculated as $ZrO_2$.

11. A process for the preparation of zirconium compounds, which comprises forming a dilute aqueous suspension of a finely divided frit having the approximate composition $Na_2O.SiO_2.ZrO_2$, said suspension containing between 100 and 250 grams of said frit per liter; while agitating and refrigerating said suspension so as to maintain it at a temperature between 5° and 15° C. gradually adding into it a hydrochloric acid solution supplying approximately 3 mols of HCl per mol of $ZrO_2$ contained in the frit; continuing the reaction of said acid until the frit is dissolved; then separating the resultant colloidal solution from residual solids; then diluting said colloidal solution to a zirconium content, calculated as $ZrO_2$, not exceeding 25–30 grams per liter, adding to it between 0.4 to 0.8 mol of sulfate ions per mol of such zirconium content and about 6 to 8% of hydrofluoric acid based upon the weight of such zirconium content, thus bringing it to a pH between 0.75 and 1.20, and heating it gradually to and holding it at a temperature between 35° and 50° C. to precipitate the zirconium content; and then settling out, washing and recovering the precipitate.

12. A process for the preparation of a basic sulfate of zirconium substantially free of silica, which comprises dissolving a finely divided frit of sodium silico-zirconate so as to form a solution of its zirconium content which contains colloidal silica by reacting said frit in a dilute aqueous suspension thereof with hydrochloric acid in the presence, at least in a latter stage of the dissolution, of fluorine ions and sulfate ions in amount sufficient to convert the dissolved zirconium content into an insoluble basic zirconium sulfate, precipitating said sulfate in the formed colloidal solution by subjecting said solution in dilute state to an elevated temperature not substantially exceeding 55° C., and settling out and separating the precipitate.

13. A process according to claim 12, said suspension containing said frit at a concentration not exceeding about 75–80 grams of the frit per liter.

14. A process according to claim 12, said acid and said ions being incorporated into said suspension by gradually adding to said suspension a solution of mixed hydrochloric, sulfuric and hydrofluoric acids.

15. A process according to claim 12, the reaction being effected by suspending said frit in water, adding hydrochloric acid to the suspension, and after a period of reaction of the hydrochloric acid diluting the suspension and adding to its hydrofluoric acid and sulfuric acid supplying the said ions.

16. A process according to claim 12, said suspension being treated in the course of the dissolution with approximately 2 mols of hydrochloric acid and less than 0.8 mol of sulfuric acid per mol of the $ZrO_2$ content, and about 6 to 8% of hydrofluoric acid based upon the weight of the $ZrO_2$ content.

17. A process according to claim 12, said suspension being maintained at a concentration not exceeding 25 grams of $ZrO_2$ content per liter when the entire amount of the said ions is present therein.

18. A process for the preparation of zirconium compounds, which comprises forming a dilute aqueous suspension of a finely divided frit having the approximate composition $Na_2O.SiO_2.ZrO_2$, said suspension containing not more than about 75–80 grams of said frit per liter; while agitating said suspension adding to it approximately 1.9 mols of hydrochloric acid per mol of the $ZrO_2$ content of said frit, approximately 0.7 mol of sulfuric acid per mol of such $ZrO_2$ content and about 7 to 8% of hydrofluoric acid based upon the weight of such $ZrO_2$ content, the latter two acids being added either at the time of or after addition of the hydrochloric acid and the suspension being diluted to a concentration of not more than 25 grams of such $ZrO_2$ content per liter by the time all the acids are added; thereafter gradually heating the formed colloidal solution to and holding it at a temperature between 45° and 55° C. until substantially all its zirconium content is precipitated; and then settling out, washing and recovering the precipitate.

19. A precipitated finely divided basic sulfate of zirconium having an amorphous structure and consisting essentially of $2ZrO_2.SO_3.xH_2O$.

References Cited

UNITED STATES PATENTS 2,294,431   9/1942   Wainer _____ 23—117

OTHER REFERENCES

Mellor: Comprehensive Treatise on Inorganic and Theoretical Chemistry, vol. 7, 1927, p. 156.

OSCAR R. VERTIZ, *Primary Examiner.*

H. S. MILLER, *Assistant Examiner.*

U.S. Cl. X.R.

23—117, 140